United States Patent Office 3,769,226
Patented Oct. 30, 1973

3,769,226
ORGANOSTANNOIC ACID AND CARBOXYLIC ACID ANHYDRIDE REACTION PRODUCT EPOXY CURING AGENT
Mark Markovitz and Leo S. Kohn, Schenectady, N.Y., assignors to General Electric Company
No Drawing. Continuation-in-part of abandoned application Ser. No. 757,156, Sept. 3, 1968. This application July 27, 1971, Ser. No. 166,613
Int. Cl. C08g 30/12, 51/62
U.S. Cl. 252—182                3 Claims

ABSTRACT OF THE DISCLOSURE

Epoxy resins cured with organostannoic acid-carboxylic acid anhydride reaction products provide rapid low-temperature curing of epoxy resins which are characterized by good electrical and physical properties including corona resistance.

---

This is a continuation-in-part of application Ser. No. 757,156, filed Sept. 3, 1968, and now abandoned.

This invention relates to curing agents for epoxy resin compositions. More particularly, it relates to organostannoic acid-carboxylic acid anhydride compositions which are capable of rapidly curing epoxy resins to provide useful end products having salutary electrical and physical properties.

Epoxy resins, as is well known, may be cured in any of a number of ways. It is often desirable to cure such epoxy resins at relatively low temperatures such as at ambient temperatures or below 100° C. In such cases amino group-containing materials such as amines or amine functional polyamides are used as hardeners or cross linkers. However, amines are skin-sensitizing agents detracting from their practical use, and epoxy resins cured therewith often tend to degrade upon exposure to heat over long periods of time. Carboxylic acid anhydrides, as opposed to amines, are more readily worked with and provide good over-all chemical, heat aging, electrical and physical properties over a wide temperature range. However, such anhydride curing agents generally require an elevated temperature for crosslinking, and relatively long post cures are required to develop their ultimate properties.

From the above it will be quite evident that there is a need for epoxy resin curing agents which will not only cure such materials at relatively low temperature but which have a community of desirable properties such as resistance to degradation at elevated temperatures and good electrical and physical properties, and it is a primary object of this invention to provide such materials.

It has been unexpectedly found that epoxy resins may be rapidly cured at relatively low temperatures with the reaction products of organostannoic acid and acid anhydrides to provide materials which are useful as electrical insulating materials and which have desirable physical properties which persist even under heat aging at relatively high temperatures. In addition, these materials were found to have good corona resistance. The acid anhydride-organostannoic acid reaction products of our invention are much more reactive hardeners for epoxy resins than conventional acid anhydride hardeners containing either amine or stannous salt accelerators.

Neither the organostannoic acid alone nor the unreacted acid anhydride and organostannoic acid together possess the requisite solubility characteristics to achieve rapid cure with epoxy resins. Organostannoic acid materials do not dissolve in epoxy resins. Butylstannoic acid, for example, does not dissolve in epoxy resins even after heating for several hours at 160° C. No useful products can be obtained by heating epoxy resins with organostannoic acids. Acid anhydrides do dissolve in epoxy resins— many at room temperature. However, organostannoic acids do not dissolve in epoxy resin-acid anhydride solutions even when heated. No useful products can be obtained by adding butylstannoic acid to epoxy resin-acid anhydride solutions.

Butylstannoic acid does not dissolve in acid anhydrides at room temperature. It does dissolve and react with acid anhydrides when heated, as more fully described below. The reaction products of organostannoic acids and acid anhydrides readily dissolve in epoxy resins and these solutions cure to clear, hard, tough materials having useful properties.

Those features of the invention which are believed to be novel are set forth with particularity in the claims appended hereto. The invention will, however, be better understood and further advantages and objects thereof appreciated from a consideration of the following description.

The organostannoic acid materials of the present invention are typified by butylstannoic acid which can be prepared, for example, from the hydrolysis of n-butyltin trichloride. Typically, the tin content of such material is from 48.0% by weight upward. The organostannoic acid materials useful in the invention are those in which the organo group is preferably an alkyl group, such a methyl, ethyl, propyl and butyl, but may also be a cycloalkyl group such as cyclopropyl, cyclobutyl, cyclopentyl and cyclohexyl, and aryl group such as phenyl or an alkaryl group such as methyl phenyl. The organo group does not enter into the reaction with the acid anhydride and thus any of a large variety and number of organo groups may be used.

The organostannoic acid material is reacted with a carboxylic acid anhydride material to form the present epoxy resin hardener or crosslinker. Generally, for each 100 parts by weight of combined material, from about 5 to 70 parts by weight of organostannoic acid are used for 95 to 30 parts of anhydride. Preferably, from about 10 to 60 parts of organostannoic acid for from 90 to 40 parts of anhydride are used. The organostannoic acid and carboxylic acid anhydride are reacted at an elevated temperature, the specific temperature depending on the specific reactants and their proportions—a higher temperature being necessary for a higher proportion of the organostannoic acid component. Typically, the temperatures of reaction vary from about 75 to 250° C. For each one hundred parts by weight of epoxy resin-hardener combination, there are used from about 5 to 65 parts of the present organostannoic acid-anhydride reaction product.

A typical anhydride is 4-endomethylenetetra hydrophthalic anhydride sold under the trademark Nadic Methyl Anhydride (NMA) which is the Diels-Alder adduct of methylcyclopentadiene and maleic anhydride. This material has a molecular weight of 178 and is supplied by Allied Chemical Company. However, any carboxylic acid anhydride may be used. Examples of useful anhydrides are aliphatic monobasic acid anhydrides such as propionic, acetic, or butyric anhydride;
aromatic monobasic acid anhydrides such as benzoic or naphthoic anhydride;
aliphatic polybasic acid anhydrides such as polyazelaic or polysebacic polyanhydride;
aliphatic cyclic polybasic acid anhydrides such as malic, succinic, alkenyl succinic, dodecenylsuccinic, itaconic, citraconic, linoleic acid adduct of maleic anhyride and other maleic anhydride adducts, hexahyrophthalic, tetrahydrophthalic, methyltetrahydrophthalic, pentanetetracarboxylic dianhydride or dichloromaleic anhydride;

aromatic cyclic polybasic acid anhydrides such as phthalic, benzophenonetetracarboxylic dianhydride, pyromellitic dianhydride, ethylene glycol bistrimellitate dianhydride, glycerol tristrimellitate trianhydride, trimellitic anhydride, chlorendic (HET anhydride), tetrabromophthalic and tetrachlorophthalic anhydride and mixtures of two or more of these anhydrides.

The following examples illustrate the preparation of the present curing agents and are to be taken as exemplary only and not limiting in any way. All parts and percentages are by weight.

EXAMPLE A

A mixture of 600 parts Nadic Methyl Anhydride (NMA) and 150 parts butylstannoic acid (BSA) was stirred and heated, the butylstannoic acid being reacted and dissolved after about 25 minutes at 148 to 206° C., the solution being stirred and heated an additional 30 minutes at 185–206° C. to provide a clear solution which solidified to a clear, pale, amber, glassy solid at room temperature. The solid had a melting point of from about 75° C. and a minimum tin content of 9.6% by weight.

EXAMPLE B

Example A was repeated using 630 parts Nadic Methyl Anhydride and 70 parts butylstannoic acid to provide a clear, medium viscosity liquid having a minimum tin content of about 4.8% by weight.

EXAMPLE C

To 150 parts of the reaction product of Example A there was added 50 parts Nadic Methyl Anhydride, the mixture being stirred at 75 to 100° C. to a clear solution. The solution was a viscous, clear liquid at room temperature, and the minimum tin content was 7.2% by weight.

EXAMPLE D

A mixture of 400 parts of Nadic U–100 anhydride and 100 parts of butylstannoic acid was stirred and heated for about 70 minutes at 157 to 173° C. The resultant product was an amber, glassy solid with a melting point of about 65° C. and a minimum tin content of 9.6% by weight.

EXAMPLE E

A mixture of 50 parts of butylstannoic acid was reacted with 150 parts of polyazelaic polyanhydride (EMERY 3455–D, PAPA, Emery Industries, Inc.) at a temperature of 160° C. for about 90 minutes. The resultant polyazelaic polyanhydridebutylstannoic acid reaction product was very reactive with epoxy resins.

EXAMPLE F

A slurry of 420 parts Nadic Methyl Anhydride and 280 parts butylstannoic acid was heated 3½ hours at 160° C.; the reaction mixture was stirred intermittently. The clear, pale, amber liquid solidified at room temperature to a clear, glassy solid which was grindable. The minimum tin content was 19.2% by weight.

EXAMPLE G

A slurry of 350 parts Nadic Methyl Anhydride and 350 parts butylstannoic acid was heated for 45 minutes at 100° C., 45 minutes at 120° C. and 120 minutes at 160° C. The reaction mixture was stirred intermittently. The clear, pale, amber viscous liquid solidified to a hard, glassy solid which was grindable. The minimum tin content was 24.0% by weight.

EXAMPLE H

A slurry of 960 parts Nadic Methyl Anhydride and 1440 parts butylstannoic acid in a one-gallon glass jar was heated for 3 hours at 160° C. and 2 hours at 170° C. with intermittent stirring. The clear, viscous liquid solidified to a clear, glassy solid which was readily grindable to a powder. The minimum tin content was 28.8% by weight.

Any of the usual epoxy or ethoxylic resins having 1,2-epoxy groups are useful in connection with the present invention. Included are the usual bisphenol-A diglycidyl ether epoxy resins as well as those derived from polyolefin or glycerides or oils. Among other useful epoxy resins are the so-called epoxy novolac resins and cycloaliphatic epoxy resins. Such resins are well known in the art and some are set forth, for example, in Pats. 2,324,-483; 2,444,333; 2,494,295; 2,500,600; and 2,511,913. Mixtures of epoxy resins can also be used. Among the specific epoxy resins used in exemplary manner in the following examples are Epon 828 of the Shell Chemical Company which is a liquid diglycidyl ether of bisphenol-A having an epoxide equivalent weight of from 185 to 190, and Epon 1001 which is a normally solid bisphenol-A diglycidyl ether reaction product made by Shell and having a melting point of from about 65 to 75° C. and an epoxide equivalent weight of 450–550.

Among the epoxy novolac resins useful in the present connection is Dow Chemical's DEN 438 which has an epoxide functionality of 3.6 and an epoxide equivalent weight of 175 to 182. Also useful in Dow Chemical's DEN 431 epoxy novolac resin having an epoxide functionality of 2.2 and an epoxide equivalent weight of 172 to 179.

Also useful are cycloaliphatic epoxy resins having 1,2-epoxy groups. Typical of such materials are Union Carbide ERLA 4221 having an epoxide equivalent weight of 126 to 140, Union Carbide ERL 4201 having an epoxide equivalent weight of 145 to 156 and Union Carbide ERL 4206 having an epoxide equivalent weight of 74 to 78. Bis(2,3-epoxycyclopentyl) ethers have also been found to be useful, such materials being typified by Union Carbide ERRA 0300 with an epoxide equivalent weight of 91 to 97 and Union Carbide 0400 with an epoxide equivalent weight of 91 to 97. Also useful is Ciba CY–175 material having an epoxide equivalent weight of 160, this material being a cycloaliphaticacetal epoxy resin.

In general, the butylstannoic acid-acid anhydride reaction products of the present invention are very reactive toward epoxy resins, such reactivity increasing with increasing butylstannoic acid content. For example, when equal parts by weight of the reaction product of Example C and ERLA 4221 epoxy resin were mixed at room temperature, the solution exothermed, gelled and hardened within two minutes. However when the lower tin compound content material of Example B was used, the working time was extended sufficiently to pour the resins into molds and to coat surfaces as by brushing or spreading with a spatula. Likewise, when equal parts by weight of the product of Example A and ERLA 4221 were combined, they exothermed and gelled during mixing. However, hard air drying coatings resulted when ingredients were diluted before mixing with nonalcoholic solvents such as methyl ethyl ketone and ethyl acetate. An air drying coating containing no solvent is prepared from 90 parts of ERLA 4221, 10 parts of an epoxide comprising a mixture of n-octyl and n-decyl glycidyl ethers and having an epoxide equivalent weight of 229 and 50 parts of the reaction product of Example B. The purpose of the mixture of n-octyl and n-decyl glycidyl ethers is to reduce the viscosity sufficiently to make it sprayable. Also, in general, glycidyl ether epoxy resins are less reactive toward the present acid anhydride-butylstannoic acid reaction products than the above cycloaliphatic epoxy resin materials.

The following examples will illustrate the curing of epoxy resins in accordance with the present invention. All parts are by weight and all examples were cured for purposes of uniformity and comparison for two hours at 100 to 140° C. and 15 hours at 160° C. unless otherwise noted. It should be realized, however, that shorter cure times and lower temperature or room temperature cures are adequate for many of the materials set forth.

Example 1

Shown in Table I below is the dissipation factor (tan δ) for a glycidyl ether epoxy resin combined in the amount shown with the material of Example A.

TABLE I

| | |
|---|---|
| Epon 828 | 60 |
| NMA-BSA (Example A) | 40 |
| Minimum Sn content  percent | 3.8 |

| Temp. (° C.): | Tan δ (60 cycles, 10 v.p.m.) |
|---|---|
| 25 | 0.0023 |
| 100 | 0.0026 |
| 130 | 0.0049 |
| 155 | 0.040 |
| 175 | 0.075 |

Example 2

Shown in Table II below is the dissipation factor at various temperatures of the combinations of cycloaliphatic epoxy resins alone and in admixture with epoxy novolac resins with the reaction product of Example A as a curing agent. Generally speaking, the epoxy novolac resulted in low dissipation losses at elevated temperatures.

TABLE II

| | Tan δ v. temperature | | |
|---|---|---|---|
| ERRA 0300, ERLA 0400 (1.0/1.0) | 60 | 35 | 25 |
| DEN 438 | | 35 | 25 |
| NMA-BSA (Example A) | 40 | 30 | 50 |
| Minimum Sn content, percent | 3.8 | 2.9 | 4.8 |

| | Tan δ (60 cycles, 10 v.p.m.) | | |
|---|---|---|---|
| Temperature, ° C.: | | | |
| 25 | 0.0020 | 0.0025 | 0.0028 |
| 100 | 0.0068 | 0.0074 | 0.0042 |
| 130 | 0.019 | 0.019 | 0.0058 |
| 155 | 0.079 | 0.054 | 0.014 |
| 175 | 0.14 | 0.096 | 0.033 |

Example 3

Shown in Table III is the dissipation factor at various temperatures of the cycloaliphatic epoxy resin ERLA 4221 crosslinked with the reaction product of Example B. Very low tan I values were obtained.

TABLE III

| | Tan δ v. temperature | | | |
|---|---|---|---|---|
| ERLA 4221 | 90 | 80 | 70 | 60 |
| NMA-BSA (Example B) | 10 | 20 | 30 | 40 |
| Minimum Sn content | 0.48 | 0.96 | 1.44 | 1.92 |

| | Tan δ (60 cycles, 10 v.p.m.) | | | |
|---|---|---|---|---|
| Temperature, ° C.: | | | | |
| 25 | 0.0037 | 0.0032 | 0.0032 | 0.0029 |
| 75 | 0.0053 | 0.0051 | 0.0055 | 0.0051 |
| 100 | 0.0061 | 0.0061 | 0.0066 | 0.0081 |
| 125 | 0.0084 | 0.0079 | 0.0084 | 0.0108 |
| 150 | 0.0072 | 0.0072 | 0.0083 | 0.0111 |
| 175 | 0.0165 | 0.0170 | 0.0107 | 0.0161 |

Example 4

Shown in Table IV is the dissipation factor at various temperatures of Epon 828 with the curing agent described in Example F.

TABLE IV

| | Tan δ v. temperature | |
|---|---|---|
| Epon 828 | 85 | 80 |
| NMA-BSA (Example F) | 15 | 20 |
| Minimum Sn content, percent | 2.88 | 3.84 |

| | Tan δ (60 cycles, 10 v.p.m.) | |
|---|---|---|
| Temperature, ° C.: | | |
| 25 | 0.0027 | 0.0032 |
| 75 | 0.0026 | 0.0025 |
| 100 | 0.0033 | 0.0024 |
| 125 | 0.0123 | 0.0084 |
| 150 | 0.080 | 0.066 |

Example 5

The heat distortion temperature and characteristics of Epon 828 with various curing agents was determined as shown in Table V below. It will be noted that higher heat distortion temperatures were obtained with this epoxy resin cured with the material of Example A as opposed to the anhydride alone or with commonly used accelerators.

TABLE V

| | | | | |
|---|---|---|---|---|
| Epon 828 | 60 | 50 | [1] 57.0 | [2] 55.5 |
| NMA-BSA (Example A) | 40 | 50 | | |
| NMA | | | [1] 43.0 | [2] 44.5 |
| DBS [3] | | | 1.0 | |
| Benzyldimethylamine | | | | 0.5 |
| Minimum Sn content, percent | 3.8 | 4.8 | 0 | 0 |

| | Temperature, ° C. | | | |
|---|---|---|---|---|
| Mils deflection: | | | | |
| 1 | 114 | 111 | 88 | 91 |
| 5 | 132 | 119 | 102 | 100 |
| 10 (HDT) | 142 | 125 | 107 | 105 |

[1] This weight ratio corresponds to 0.80 anhydride equivalent/1.0 epoxy equivalent.
[2] This weight ratio cor. to 0.85 anhydride equivalent/1.0 epoxy equivalent.
[3] Argus Chemical Co. epoxy-anhydride reaction catalyst containing zinc octoate and triphenyl phosphite.

Example 6

Shown in Table VI below are the heat distortion characteristics of epoxy novolac resin DEN 431 cured with the material of Example A and with the Nadic Methyl Anhydride alone. It will be noted that the present crosslinking agents provide a substantially higher heat distortion temperature (HDT) than the same epoxy resin cured solely with the anhydride.

TABLE VI

| | | | |
|---|---|---|---|
| DEN 431 | 60 | 50 | [1] 53.7 |
| NMA-BSA (Example A) | 40 | 50 | |
| NMA | | | [1] 46.3 |
| BDMA | | | 0.5 |
| Minimum Sn content, percent | 3.8 | 4.8 | 0 |

| | Temperature, ° C. | | |
|---|---|---|---|
| Mils deflection: | | | |
| 1 | 141 | 130 | 107 |
| 5 | 151 | 139 | 117 |
| 10 (HDT) | 157 | 143 | 125 |

[1] This weight ratio corresponds to 0.85 anhydride equivalent/1.0 epoxy equivalent.

Example 7

This example shows in Table VII the heat distortion characteristics of various combinations of cycloaliphatic epoxy resins and such materials to which had been added an epoxy novolac resin, all being cured with the reaction product of Example A. It should be noted that when 38.4 parts by weight of a 50/50 by weight mixture of ERRA 0300 and ERLA 0400 were mixed with 61.6 parts of Nadic Methyl Anhydride with 0.5 part of benzyl dimethylamine as a curing accelerator, no cure or hardening occurred even after 15 hours at 160° C.

Similarly, when stannous octoate was used in place of benzyl dimethylamine no cure or hardening occurred even after 15 hours at 160° C.

TABLE VII

| | | | | | |
|---|---|---|---|---|---|
| ERRA 0300-ERLA 0500 (1.0/1.0) | 50 | 60 | 25 | 30 | 35 |
| DEN 438 | | | 25 | 30 | 35 |
| NMA-BSA (Example A) | 50 | 40 | 50 | 40 | 30 |
| Minimum Sn content, percent | 4.8 | 3.8 | 4.8 | 3.8 | 2.9 |

| | Temperature, ° C. | | | | |
|---|---|---|---|---|---|
| Mils deflection: | | | | | |
| 1 | 146 | 107 | 151 | 150 | 90 |
| 5 | 157 | 125 | 160 | 161 | 102 |
| 10 (HDT) | 163 | 135 | 165 | 168 | 113 |

Example 8

This example illustrates in Table VIII the heat distortion characteristics of ERLA 4221 cycloaliphatic epoxy resin cured with the present materials. It will be noted that much higher heat distortion temperatures were obtained using the curing agent of Example B in accordance with the present invention than with unmodified Nadic Methyl Anhydride plus an accelerator.

TABLE VIII

| | | | | |
|---|---|---|---|---|
| ERLA 4221 | 50 | 60 | [1] 48.4 | [2] 46.8 |
| NMA-BSA (Example B) | 50 | 40 | | |
| NMA | | | [1] 51.6 | [2] 53.2 |
| DB8 | | | 1.0 | |
| Benzyldimethylamine | | | | 0.5 |
| Minimum Sn content, percent | 2.4 | 1.9 | 0 | 0 |

| | Temperature, °C. | | | |
|---|---|---|---|---|
| Mils deflection: | | | | |
| 1 | 86 | 105 | 73 | 55 |
| 5 | 114 | 136 | 97 | 89 |
| 10 (HDT) | 131 | 147 | 108 | 103 |

[1] This wt. ratio corresponds to 0.8 anhydride equivalent/1.0 epoxy equivalent.
[2] This wt. ratio corresponds to 0.85 anhydride equivalent/1.0 epoxy equivalent.

Example 9

This example shows in summary in Table IX the tensile strength and elongation at break characteristics of various epoxy resins cured with the material of Example A. Tensile strength samples were aged in this instance at 135° C. and 160° C. in air-circulating ovens. It will be noted that the tensile strength generally increased during aging at 135° C. The tensile strength of one system increased after 28 days aging at 160° C., but such aging caused only a minor decrease in tensile strength for the remainder of the samples.

TABLE IX

| | | | | | |
|---|---|---|---|---|---|
| DEN 438 | 25 | 30 | | | |
| ERRA 0300-ERLA 0400 (10/1.0) | 25 | 30 | | | |
| Epon 828 | | | 50 | | |
| DEN 431 | | | | 50 | 60 |
| NMA-BSA (Example A) | 50 | 40 | 50 | 50 | 40 |
| 15 Hrs. at 160° C.: | | | | | |
| Tensile strength at 25° C., p.s.i. | 4,500 | 6,500 | 6,100 | 6,100 | 7,400 |
| Percent elongation at break | 1.3 | 2.1 | 1.8 | 1.8 | 2.5 |
| 28 days at 135° C. in air: | | | | | |
| Tensile strength at 25° C., p.s.i. | 5,400 | 6,700 | 6,900 | 6,300 | 7,200 |
| Percent elongation at break | 1.5 | 2.1 | 2.0 | 1.7 | 2.2 |
| 28 days at 160° C. in air: | | | | | |
| Tensile strength at 25° C., p.s.i. | 4,600 | 6,300 | 6,000 | 5,800 | 6,500 |
| Percent elongation at break | 1.3 | 1.7 | 1.7 | 1.6 | 2.0 |

Example 10

This example shows in Table X the flexural strength of various systems at 25° C. and the effect on this property of heat aging the materials in air.

TABLE X

| | | | | | |
|---|---|---|---|---|---|
| DEN 438 | 25 | 30 | | | |
| ERRA 0300-ERLA 0400 (1.0/1.0) | 25 | 30 | | | |
| Epon 828 | | | 50 | | |
| DEN 431 | | | | | 60 |
| NMA-BSA (Example A) | 50 | 40 | 50 | | 40 |
| 15 hours at 160° C.; Flexural strength at 25° C., p.s.i. | 8,000 | 13,400 | 9,700 | | 16,900 |
| 28 days at 135° C. in air; Flexural strength at 25° C., p.s.i. | 9,800 | 13,100 | 11,000 | | 15,200 |
| 28 days at 160° in air; Flexural strength at 25° C., p.s.i. | 8,100 | 13,300 | 12,100 | | 16,600 |

Example 11

This example illustrates, as shown in Table XI, the resistance to water and thermal degradation of materials prepared in accordance with the present invention. In the water resistance tests the percent weight increase in water was determined for samples 2″ long by 1″ wide by 0.09″ thick at 25° C. and 90° C. for 14 days. No visible color or appearance change was obtained in the samples after the test.

In testing thermal degradation, samples 4″ long by 1″ wide by 0.09″ thick were aged for 4 weeks at 135° C. and 160° C. in air-circulating ovens. The samples did not change in appearance after the aging test and were still strong and transparent.

TABLE XI

| | | | | | |
|---|---|---|---|---|---|
| DEN 438 | 25 | 30 | | | |
| ERRA 0300-ERLA 0400 (1.0/1.0) | 25 | 30 | | | |
| Epon | | | 50 | | |
| DEN 431 | | | | 50 | 60 |
| NMA-BSA (Example A) | 50 | 40 | 50 | 50 | 40 |

| | Water resistance, percent weight increase in $H_2O$ | | | | |
|---|---|---|---|---|---|
| 14 days in $H_2O$ at 25° C. | 1.65 | 1.77 | 0.81 | 0.86 | 1.01 |

| | Thermal degradation, percent weight change | | | | |
|---|---|---|---|---|---|
| 28 days at 135° C. in air | +0.30 | +0.30 | +0.23 | +0.38 | +0.43 |
| 28 days at 160° C. in air | +0.22 | +0.25 | −0.07 | +0.31 | +0.55 |

Example 12

This example shows in Table XII the resistance to corona of the present materials. In the tests, 30 mil thick samples were tested using a needle point electrode with an air gap of 15 mils at 105° C. in air and at 3000 cycles and 2500 volts.

TABLE XII

[Air atmosphere, 105° C., 3,030 cycles, 2,500 v. sample thickness 30 mils, air gap 15 mils]

| Sample | Average failure time [1] hours | Range, hours |
|---|---|---|
| Epon 101-N-aminoethylpiperazine | 17 | 3–23 |
| ERLA 4221-B RPA phenolic resin | 32 | 27–38 |
| Mylar (polyethylene terephthalate) | 21 | 17–26 |
| H-Film (aromatic polyimide) | 41 | |
| DEN 438 (25 parts)-ERRA 0300 (12.5 parts) | [2] | [2] |
| ERLA 0400 (12.5 parts)-MNA-BSA (Example A) (50 parts) | | |
| Sn content 4.8% | [2] | [2] |
| Silicone rubber | [3] | [3] |

[1] Average of 3 or 4 samples.
[2] No failures after 1,200 hours.
[3] More than 5,000 hours.

Example 13

This example shows how the high reactivity of the acid anhydride-butylstannoic acid reaction products can be used to prepare fluid bed powders. The solid epoxy novolac Dow Chemical's DEN 445 (epoxide equivalent weight 230–250, M.P. 78–82° C.) was ground to a fine powder and the product of Example G was also ground to a fine powder. Fifty parts of the powdered epoxy novolac was mixed with 50 parts of the powdered product of Example G to give a powder useful for coating by the fluid bed technique. When a metal part was preheated to 160° C. and immersed in the fluidized powder, a hard, glossy coating resulted. The powder fused and gelled on the metal within seconds and there was no runoff of resin.

There are provided, then, by this invention organostannoic acid-carboxylic acid anhydride reaction products and compositions thereof with epoxy resins, which latter are characterized by resistance to thermal degradation, good corona resistance, resistance to degradating effects of water, and other salutary mechanical and electrical properties.

Epoxy resin compositions prepared according to the present invention are particularly useful where resistance to compression forces and high tensile and flexural strengths are required at elevated temperatures. The resins are useful as adhesives, encapsulating and potting compounds. They can be used as binders in micaceous tapes, for prepregs and other laminated structures and in filament winding applications. They are, of course, particularly useful where cure is required or convenience at ambient temperatures or below about 100° C. The present compositions are useful in preparing molding powders and fluidized bed powders. They can be filled in the usual manner with organic and inorganic fillers, as indicated, to provide a wide variety of final characteristics.

What we claim as new and desire to secure by Letters Patent of the United States is:

1. The reaction product of by weight from 5 to 70 parts organostannoic acid in which the organo group is selected from the class consistnig of alkyl, cycloalkyl, aryl and alkaryl and 95 to 30 parts of a carboxylic acid anhydride selected from the group consisting of aliphatic monobasic acid anhydrides, aromatic monobasic anhydrides, aliphatic polybasic acid anhydrides, aliphatic cyclic polybasic anhydrides, aromatic cyclic polybasic acid anhydrides and mixtures thereto, the reaction between the organostannoic acid and the carboxylic acid anhydride taking place when heated.

2. The reaction product as in claim 1 using 10 to 60 parts by weight of organostannoic acid and 90 to 40 parts of carboxylic acid anhydride.

3. The reaction product of claim 1 wherein said organostannoic acid is butylstannoic acid.

References Cited
UNITED STATES PATENTS

| | | | |
|---|---|---|---|
| 3,211,768 | 10/1965 | Considine | 260—546 |
| 3,478,071 | 11/1969 | Weisfeld | 260—429.7 |
| 3,362,922 | 1/1968 | Manasia et al. | 260—47 EC |
| 3,509,104 | 4/1970 | Fuchsman et al. | 260—429.7 |
| 3,622,524 | 11/1971 | Markovitz et al. | 260—429.7 |

LEON D. ROSDOL, Primary Examiner

I. GLUCK, Assistant Examiner

U.S. Cl. X.R.

117—161 ZB; 260—2 EP, 2 EC, 47 EP, 47 EC, 78.4 EP, 429.7, 546